United States Patent [19]

Matousek

[11] 4,026,516
[45] May 31, 1977

[54] BALL VALVE STEM GUIDE

[75] Inventor: Stephen Matousek, Moraga, Calif.

[73] Assignee: Whitey Research Tool Co., Emeryville, Calif.

[22] Filed: May 28, 1970

[21] Appl. No.: 41,494

[52] U.S. Cl. .............................. 251/214; 251/317; 251/315

[51] Int. Cl.² ...................................... F16K 27/06

[58] Field of Search ................. 137/454.2, 454.6; 251/171, 315, 3–16, 317, 214

[56] References Cited

UNITED STATES PATENTS

| | | | |
|---|---|---|---|
| 3,030,068 | 4/1962 | Priese | 251/214 |
| 3,168,900 | 2/1965 | Hansen | 137/454.6 |
| 3,236,495 | 2/1966 | Buchholz | 251/171 |
| 3,441,249 | 4/1969 | Aslan | 251/214 X |
| 3,445,087 | 5/1969 | Priese | 251/214 X |

Primary Examiner—Harold W. Weakley
Attorney, Agent, or Firm—Fay & Sharpe

[57] ABSTRACT

The specification and drawings show a ball valve including a housing defining a valve chamber with inlet and outlet passages connected to the chamber. A ball having at least one throughflow aperture is positioned within the chamber and arranged for selective rotation by a cylindrical stem which extends from the chamber. Resilient, resinous material substantially fills the chamber and sealingly engages the outer surface of the ball and the inner walls of the chamber. Packing means are disposed about the stem and include a relatively rigid first gland member closely and slidably received in the housing and having an opening through which the stem extends. A first surface of the gland is engaged with the resinous material in the chamber. A recess is formed in the gland member about the inside of the opening. Preferably, the recess has a substantial length axially of the stem. An elongated bushing of resilient, resinous material is positioned in the recess and adjustable means are provided for applying a compressive loading axially of the bushing in a direction toward the first surface to compress the bushing into sealing engagement with the stem and cause the gland member to apply a compressive load on the resinous material within the chamber. Preferably, the bushing is formed from polytetrafluoroethylene or the like.

10 Claims, 4 Drawing Figures

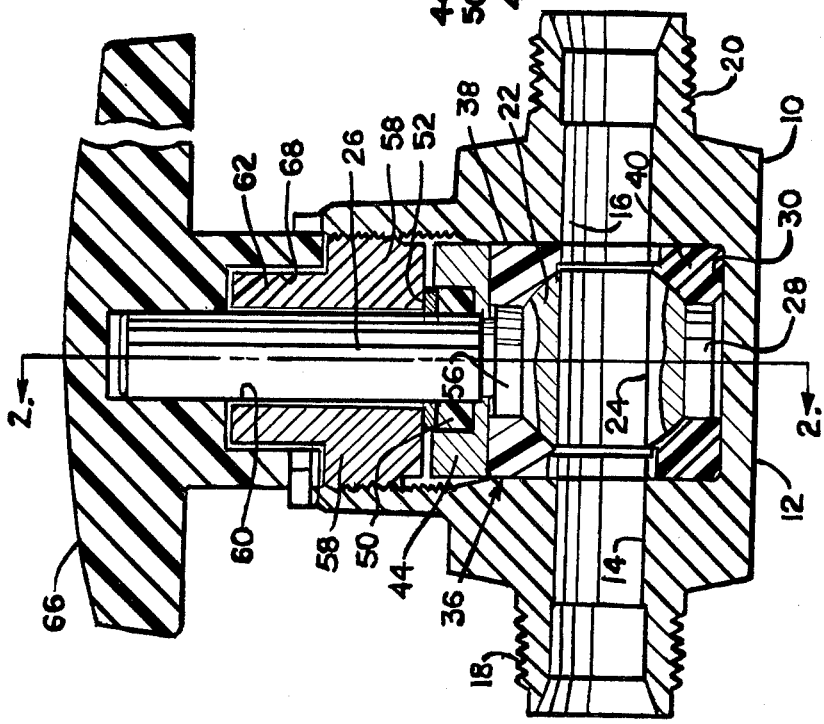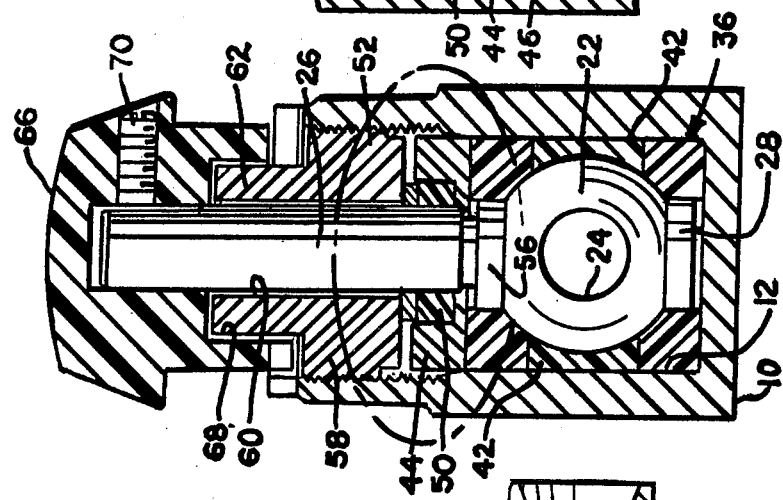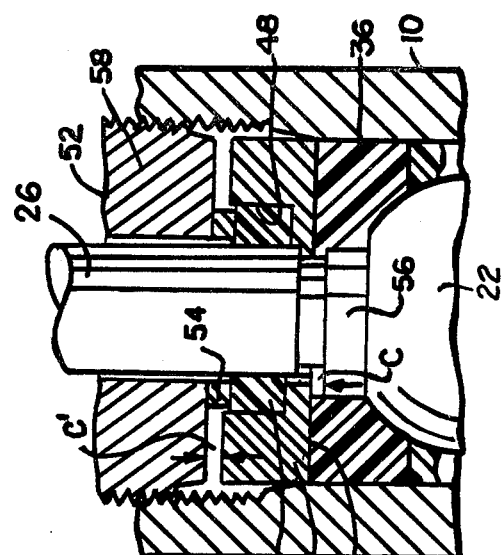
Fig. 1.
Fig. 2.
Fig. 3.

BALL VALVE STEM GUIDE

The present invention is directed toward the valve art and, more particularly, to an improved ball valve of the type having the ball encapsulated in a resilient, resinous seal.

The invention is particularly suited for ball valves of the smaller size as used for instrumentation and the like, and will be described with particular reference thereto; however, it will be appreciated that the invention is of broader application and could be embodied in many sizes of valves for a variety of uses.

Ball valves of the type which have the ball enclosed in a cartridge or capsule of a resilient synthetic resin, such as polytetrafluoroethylene, are well-known and in widespread use. Typically, the valves have included a rigid metal housing that defines a valve chamber in which the ball and the capsule are held. The required inlet and outlet flow passages extend through the housing and the capsule and terminate adjacent the ball. A ball operating stem extends from the ball through the capsule and housing.

Generally, fluid sealing between the ball and the stem, and the capsule, was provided by applying a compressive preloading to the capsule to cause it to tightly engage the ball and the stem. Because of the relatively thin nature of the capsule, at least below the ball, it acts as a very stiff spring i.e. a large compressive force produces a very small deflection. Consequently, a slight wearing of the capsule produces a substantial reduction in compressive loading which tends to permit the valve to leak about the ball and stem.

To overcome the above problems, the prior art has used relatively complicated mechanical spring loading arrangements for the capsule and somewhat complex stem seal arrangements. Typically, these approaches have increased the complexity and cost of the valves without fully solving the problem.

The subject invention provides a highly simple solution to the above-discussed problems. Broadly, the invention concerns a stem seal and guide bushing arrangement including a secondary packing on the stem that functions to guide the stem and act as a spring to maintain a more nearly constant compressive load on the capsule.

Valves formed in accordance with the invention are capable of operating for an extremely large number of cycles before any leakage takes place. Further, with the invention, tightening of the packing can be accomplished rapidly without removing the valve from the line.

In accordance with one aspect of the invention there is provided a ball valve including a housing defining a valve chamber with inlet and outlet passages connected to the chamber. A ball having at least one aperture is positioned within the chamber and arranged for selective rotation by a cylindrical stem which extends from the chamber. Resilient, resinous material substantially fills the chamber and sealingly engages the outer surface of the ball and the inner walls of the chamber. The improvement comprises packing means about the stem and including a relatively rigid first gland member closely and slidably received in the housing and having an opening through which the stem extends, and a first surface engaged with the resinous material in the chamber. A recess is formed in the gland member about the inside of the opening. Preferably, the recess has a substantial length axially of the stem. An elongated bushing of resilient, resinous material is positioned in the recess and adjustable means are provided for applying a compressive loading axially of the bushing in a direction toward the first surface to compress the bushing into sealing engagement with the stem and cause the gland member to apply a compressive load on the resinous material within the chamber. Preferably, the bushing is formed from polytetrafluoroethylene or the like.

Because of the substantial length of the bushing, it acts as a relatively strong spring i.e. a large increase in force for a small deflection. Consequently, a slight wearing of the resinous material around the ball results in only a slight change in the compressive loading. Moreover, the arrangement of the bushing allows it to act as a guide for the stem and absorb any side thrust placed on the stem by a heavy handed operator or misalignment of the actuator.

Accordingly, the primary object of the invention is the provision of an improved ball valve stem packing and capsule loading arrangement which overcomes problems present in prior ball valves. Namely, slight wearing of resinous material around the ball results in a large change in compressive loading.

Another object is the provision of a capsule loading arrangement which is easy to adjust and wherein wearing between the capsule and the ball produces only a slight change in the compressive loading on the capsule.

Yet another object of the invention is the provision of a ball valve of the type described wherein the stem packing serves as a loading spring for the capsule.

A still further object is the provision of a ball valve of the type described in which the loading on the capsule can be easily adjusted while the valve is in service.

Another object is the provision of a valve which is easy to manufacture and extremely reliable in operation.

The above and other objects and advantages will become apparent from the following description when read in conjunction with the accompanying drawing wherein:

FIG. 1 is a longitudinal cross-section through a preferred embodiment of the invention;

FIG. 2 is a cross-sectional view taken on line 2—2 of FIG. 1;

FIG. 3 is an enlargement of the circled portion of FIG. 2; and,

Figure 4:
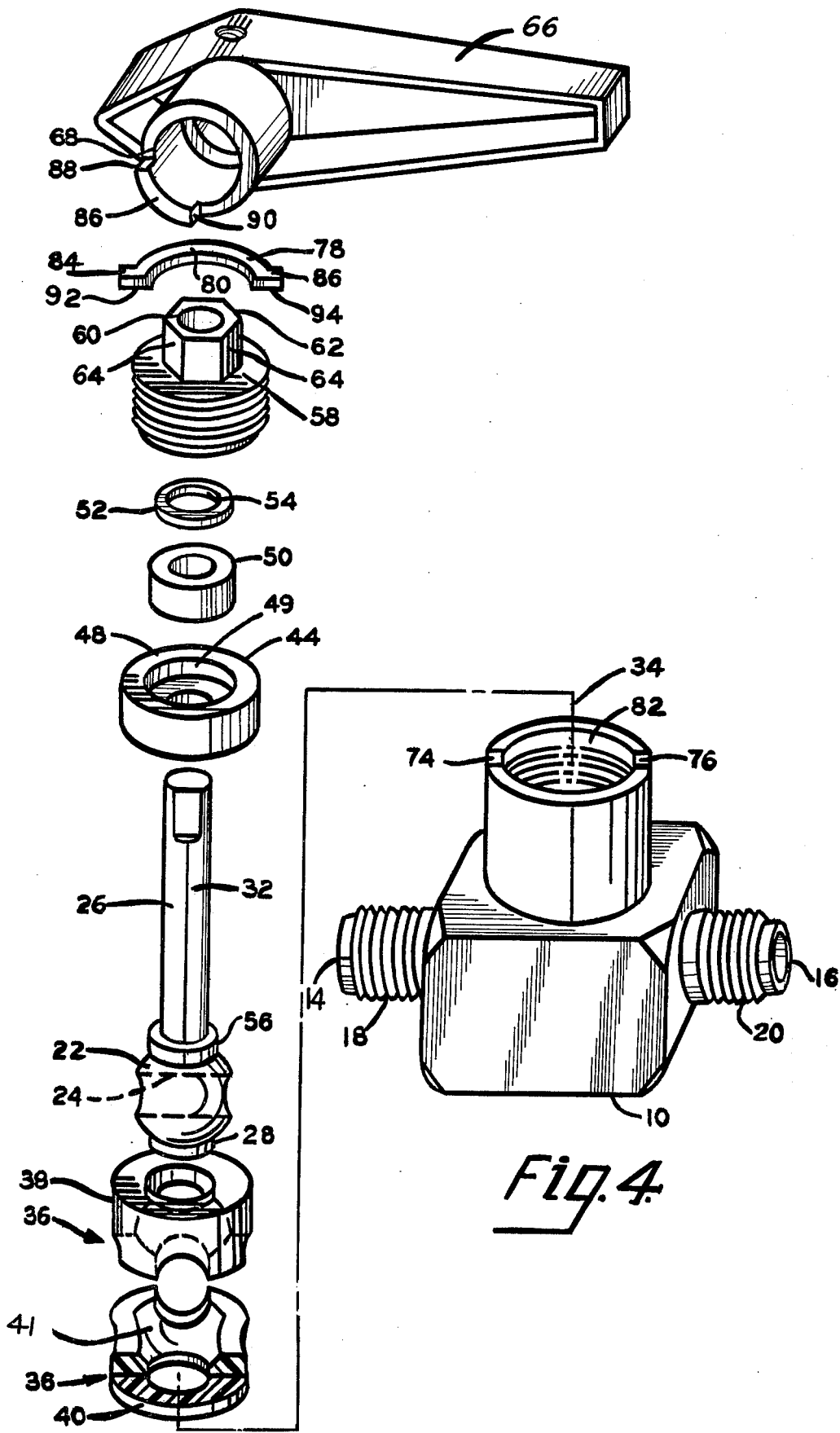
FIG. 4 is an exploded pictorial view of the valve shown in FIG. 1.

Referring more particularly to the drawings wherein the showings are for the purpose of illustrating a preferred embodiment of the invention only, and not for the purpose of limiting same, FIG. 1 shows a longitudinally cross-section through a ball valve which is a preferred embodiment of the invention. The valve includes a housing 10 which defines an internal valve chamber 12 and inlet and outlet flow passageways 14 and 16. In the embodiment under consideration, the valve housing 10 is a one-piece body generally referred to as a "bar stock". That is, it is machined from a single piece of material such as brass, stainless steel or the like. Obviously, the housing could be of many types such as the standard cast and/or multi-piece housings. As previously mentioned, the housing 10 defines an internal valve chamber which, in the embodiment under consideration, is cylindrical and extends axially into the housing 10. The inlet and outlet flow passages 14 and 16 are also preferably cylindrical and intersect valve chamber 12 at right angles. It is to be understood that although the valve is shown as a standard straight through flow valve, it could, within the scope of the invention, have other flow patterns and, for example, be a three-way valve with a Y flow pattern or other more complex flow arrangements.

In the embodiment shown, the inlet and outlet flow passages 14 and 16 have threaded end portions 18 and 20 respectively arranged so that standard tube fitting can be used to connect the valve into the line being controlled. Clearly, other types of connecting arrangements could be used without departing from the scope of the invention.

Positioned within the valve chamber 12 and arranged to control the flow between the inlet and outlet passages 14 and 16, is a ball valve element 22. In the embodiment shown, the ball valve element 22 is, as best seen in FIG. 4, of spherical configuration and provided with a transversely extending aperture 24. An integrally formed operating stem 26 extends outwardly of the ball perpendicular to the aperature 24 and aligned with the center of the ball. A trunion member 28 is formed on the lower surface of the ball and axially aligned with the operating stem 26. The trunion 28 is arranged to engage the lower wall 30 of the valve chamber 12. The detail arrangement of trunion 28 and its relationship to the ball and the capsule or packing form a separate invention which is described and claimed in the commonly assigned co-pending application Ser. No. 41,381, now U.S. Pat. No. 3,675,895, titled "Improved Trunion Mounting for Encapsulated Ball Valve", filed concurrently herewith.

The ball member 22 is positioned in the valve chamber 12 with its axis 32 aligned with the axis 34 of the valve chamber. The ball member 22 is enclosed or encapsulated by a packing 36 which is formed from a synthetic resilient, resinous material such as polytetrafluoroethylene. In the embodiment consideration, the packing is formed in two halves as best shown in FIG. 4. Note that the packing 36 includes two symmetrical sections 38 and 40 of generally semi-cylindrical configuration. Each section has an internal recess 40 adapted to closely receive the outer surface of the ball 22. Suitable openings are provided for receiving the operating stem 32 and the trunion 28. Additionally, parts are formed diagonally through the members 38 to connect the inlet and outlet flow passageways 14 and 16 with the ball 22. Preferably, in accordance with the teachings of U.S. Pat. No. 3,236,495, metal insert rings are positioned within the ports of the packing. Additionally, rigid disc or insert members 42 are positioned between the ball and the internal wall of the valve chamber 12 as best shown in FIG. 2. As described in the previously mentioned U.S. Pat. No. 3,236,495, the members 42 prevent extrusion of the packing into aperature 24 when the ball is moved to the off position.

The packing sections 38 are sized so as to fit snugly within the valve chamber 12 and closely engage the outer surface of ball 22. To provide a proper sealing engagement between the outer surfaces of the inserts or capsule portions 30, and the internal wall of the chamber 12, as well as to sealingly engage the outer surfaces of the ball 22, the inserts are assembled in the valve chamber and placed under a compressive preload. In accordance with the invention, the preloading is accomplished by a unique stem seal and bushing arrangement which maintains the packing under a substantially uniform compressive loading even if some wear takes place between the packing and the surface of the ball valve. Although the arrangement could have many variations with the scope of the invention, according to the preferred embodiment shown, the stem packing and preload arrangement includes a first relatively rigid gland member 44 (see FIGS. 2 and 3). The gland member 44 is arranged to be closely but slidably received in the upper end of the valve chamber 12 and has a first face 36 which engages the top surface of the packing 36. In the embodiment under consideration, the gland member 44 is cylindrical and has a central, axially extending opening 48 of a diameter slightly larger than the outer diameter of the stem 26. An axially elongated recess 48 extends circumferentially about the opening 48 and inwardly from the upper end of the gland 44. A cylindrical bushing of resilient resinous material, preferably polytetrafluoroethylene, is positioned within the recess and sized so as to closely engage the surface of the recess and the outer surface of the stem 26. Preferably, the total axial length of the bushing 50 is slightly less than the axial length of the recess 48. Additionally, the bushing length is preferably greater than the height of the trunion by a substantial amount.

A second gland member 52 is positioned about stem 26 and rests on the upper surface of bushing 50, as viewed in FIG. 3. Note that the gland member 52 is closely but slidably received in the upper end of recess 50 and has a central opening 54 which is of a diameter substantially greater than the outer diameter of the shaft 26. By applying an axially directed force to the upper surface of gland 52, the bushing 50 is placed under a compressive load causing it to sealingly engage the outer surface of the stem 26. Additionally, because of the length of bushing 50, it tends to act as a relatively strong spring and applies an axial load to the gland 44 which, in turn, applies the required preload to the capsule or packing 36. Thus, the bushing 50 not only serves as a secondary stem seal, but also functions to apply a springlike loading to the packing 36. Because the bushing 50 acts as a strong spring (i.e. a small change in deflection produces a large change in force) wearing between the packing 36 and the ball 22 results in only a relatively insignificant change in compressive loading. In line with the loading produced through gland 44, the gland is arranged so that there is a space between the surface 46 and the upper surface of the enlarged portion 56 of stem 26.

Many arrangements could be utilized for applying an adjustable axial force to the second gland member 52. Preferably, and in accordance with a more limited aspect of the invention, the adjustable loading of gland 52 is accomplished by a nut member 58 threadably received in the upper end of the valve chamber 12. Note that the nut member 58 has an axial opening 60 which is of a diameter slightly greater than the outer diameter of the stem 26. Although many different arrangements could be provided for rotating the member 58 to adjust its position within the valve chamber and, accordingly, its load on gland 52, in the embodiment shown the means utilized comprise an upwardly extending portion 62 provided with wrench receiving flats 64.

The valve operating handle 66 is arranged to enclose the end portion 62 of member 58. As best shown in FIGS. 1 and 2, the handle has an opening extending into its main body portion which receives the upper end of the operating stem 26. A recess or enlarged opening 68 is adapted to receive the portion 62 and is of a diameter larger than the maximum diagonal of portion 62. The handle is releasably connected to the stem in any convenient manner, such as through the use of a set screw 70 which engages a flat formed on the upper end of the stem.

Preferably, the handle is arranged to have defined stops at 90° spacings so that positive exact positioning of the valve in the On and Off positions is assured. In the subject embodiment, the stops are defined by 180° raised portions 74 and 76 formed on the body (see FIG. 4). A stop insert member 78 is arranged to be received with its arcuate portion 80 engaged in raised section 82 between the stop surfaces 74 and 76. The outwardly extending ears or tabs 84 and 86 on the insert 80 engage surfaces 74 and 76. The handle has a depending portion 86 which defines two surfaces 88 and 90 which are spaced exactly 90° apart. The handle fits within the diameter of portion 82 and the surfaces 88 and 90 engage the shaded portions 92 and 94 on the stop insert 78 to provide a positive stop for the valve in both its open and closed position.

The invention has been described in great detail sufficient to enable one of ordinary skill in the valve art to make and use the same. Obviously, modifications and alterations of the preferred embodiment will occur to others upon a reading and understanding of the specification. It is our intention to include all such modifications and alterations as part of our invention insofar as they come within the scope of the appended claims.

And thus describing our invention, we claim:

1. In a ball valve including a housing defining a valve chamber, inlet and outlet passages connected to said chamber, a ball positioned in said chamber and having at least one aperture extending therethrough, means including a cylindrical stem engaged with said ball and extending out of said housing for rotating said ball, resilient resinous material substantially filling said chamber and sealingly engaging said ball and the walls of said chamber, the improvement comprising:

packing means about said stem including a relatively rigid first gland member closely and slidably received in said housing, said gland member having an opening through which said stem rotatably extends, an elongated recess formed axially inwardly in said gland member about the inside of said opening, said recess terminating in a bottom wall defined by said gland member and being substantially filled with a bushing of resilient resinous material; and, adjustable means engaging the outer axial end of said bushing and mounted for free movement axially of said shaft, and said first gland member for applying compressive loading to said bushing to compress said bushing into sealing engagement with said stem and to indirectly cause said gland member to apply a compressive load on the resinous material in said chamber so that substantially all of the compressive loading applied to said resilient material in said chamber is transmitted through said packing.

2. The improved ball valve as defined in claim 1 wherein said adjustable means comprises a second gland member closely surrounding said stem and having first and second oppositely facing surfaces, said first surface engaging said bushing and said second surface engaged by a threaded member carried in said housing.

3. The improved ball valve as defined in claim 1 wherein said bushing is of cylindrical configuration and wherein said stem passes axially through said bushing.

4. The improved ball valve as defined in claim 3 wherein said adjustable means includes a screw member extending into said housing and surrounding said stem, said screw member engaged with said bushing through a second gland member positioned about said stem and between said screw member and said said bushing, said second gland member being closely and slidably received by said first gland member and enclosing said bushing in said first gland member.

5. The improved ball valve as defined in claim 1 wherein said first gland member is of cylindrical configuration and has a first end surface engaging the resinous material in said chamber, and a second end surface which faces said adjustable means, said recess extending from said second end surface to a position closely adjacent said second end surface.

6. A ball valve including: a housing having a generally cylindrical valve chamber extending into said housing and having a closed inner end and an open outer end; inlet and outlet passages extending through said housing and into said chamber, the axes of said passages being generally perpendicular to the axis of said chamber; a ball member positioned in said chamber and mounted for rotation about an axis aligned with the axis of said chamber, said ball member having at least one aperture extending therethrough and arranged to control flow between said inlet and outlet passages depending upon the position of rotation of said ball; said chamber being substantially filled by resilient, resinous material which sealingly engages the inner walls of said chamber and the outer surface of said ball, ports formed through said resinous material at locations aligned with said inlet and outlet passages, said ports being generally equal in size to the diameter of said passages; a relatively rigid metallic gland member positioned in said housing at the outer end of said chamber, said gland being cylindrical and closely received in said cylindrical valve chamber; a cylindrical opening extending axially through said gland and a ball operating shaft carried by said opening and engaged with said ball; an annular, axially elongated recess terminating in a bottom wall defined by said gland and formed in said opening about said shaft and a bushing of resilient resinous material substantially completely filling said recess; and, adjustable means engaging the outer axial end of said bushing and mounted for free movement axially of said shaft and said first gland member for applying compressive force to said bushing and said gland so that substantially all of the compressive loading applied to said resilient material in said chamber is transmitted through said packing.

7. The ball valve as defined in claim 6 wherein said adjustable means comprises a nut member threadedly received in the outer end of said cylindrical valve chamber.

8. The ball valve as defined in claim 7 wherein said adjustable means includes a second gland member positioned between said nut member and said bushing.

9. The ball valve as defined in claim 7 wherein said adjustable means is positioned about said shaft and engages the outer end of said bushing through a second gland member.

10. The ball valve as defined in claim 7 wherein said second gland is closely received in said first gland member.

* * * * *